Nov. 21, 1933.  J. ORTH  1,936,173
ENSILAGE CUTTER AND BLOWER
Filed Feb. 8, 1932    2 Sheets-Sheet 1

Inventor
J. Orth

Nov. 21, 1933.                    J. ORTH                    1,936,173
                        ENSILAGE CUTTER AND BLOWER
                           Filed Feb. 8, 1932        2 Sheets-Sheet 2

Inventor
J. Orth
By
Attorneys

Patented Nov. 21, 1933

1,936,173

UNITED STATES PATENT OFFICE 1,936,173

ENSILAGE CUTTER AND BLOWER

John Orth, Cleveland, Wis.

Application February 8, 1932. Serial No. 591,607

2 Claims. (Cl. 146—107)

This invention appertains to ensilage cutters and blowers and more particularly to a novel attachment for a silo filling machine.

In ensilage cutting and blowing machines, considerable difficulty is experienced during the operation thereof, due to the fact that the fine stuff being acted on by the machine falls below the feed rolls for the cutter head or cylinder. This fine stuff is not only lost, but also forms a large pile under the machine, which often completely clogs and stops the operation of the machine.

It is, therefore, a primary object of my invention to provide an attachment for a standard ensilage cutter and blower, which will receive the fine stuff, as the same falls below the feed rolls and deliver the same into the blower casing, whereby this fine stuff will be saved and thrown into the silo with the other ensilage cut by the cutter head or cylinder.

Another salient object of my invention is the provision of an attachment for ensilage cutters and silo fillers, embodying an endless conveyor arranged below the usual feed trough or table of the ensilage cutter at the throat end of the machine, the endless belt extending under the feed rolls of the machine and into the machine below the cutter head or cylinder, the endless belt being of such a character as to permit the same to be readily driven from the feed conveyor of the machine.

A further object of my invention is the provision of means whereby the attachment can be readily and rigidly secured in place to the frame of the machine by the ordinary layman, without necessitating the employance of skilled labor.

A further object of my invention is the provision of means mounted on the attachment for taking care of any slack which might occur in the drive chain for the endless conveyor thereof and any slack which might occur in the endless conveyor itself.

A still further object of my invention is to provide an ensilage cutter and blower of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically set forth, claimed and illustrated in the accompanying drawings, in which:

Referring to the drawings in detail, wherein similar reference characters designate corresponding parts throughout the several views, the letter A generally indicates my improved attachment for an ensilage cutter and blower B.

Figure 1:
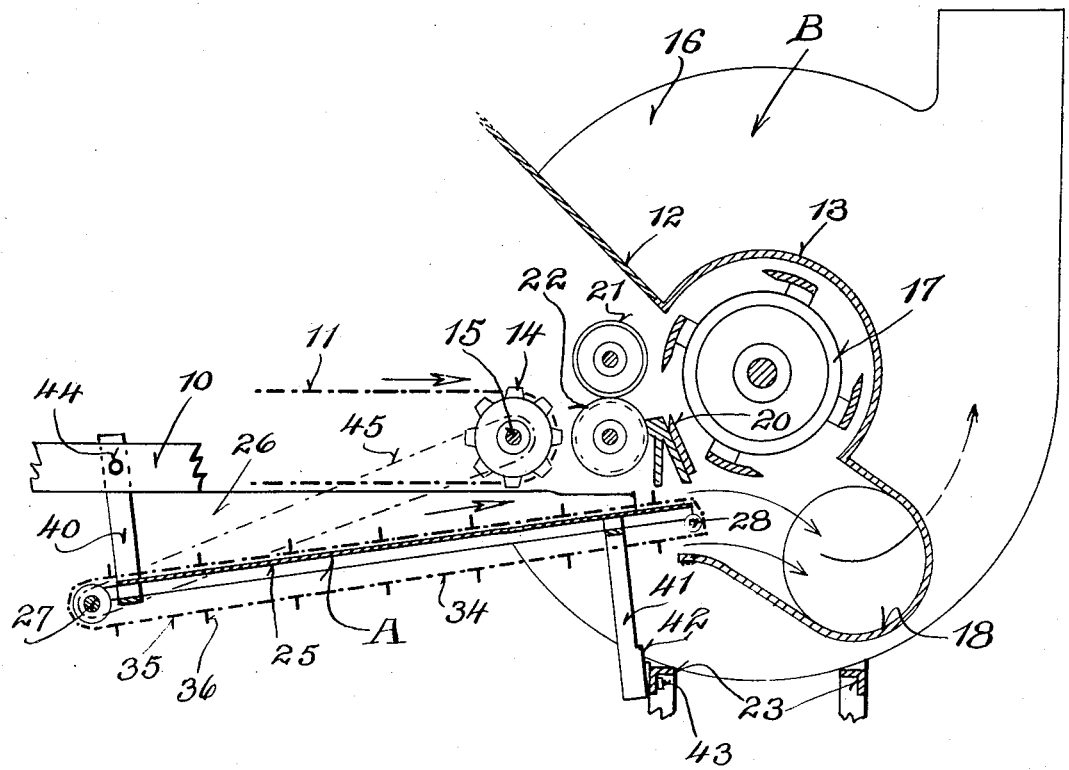
Figure 1 is a fragmentary longitudinal section illustrating the application of my attachment to a conventional ensilage cutter and blower, the view being of a diagrammatic nature.
Figure 2:
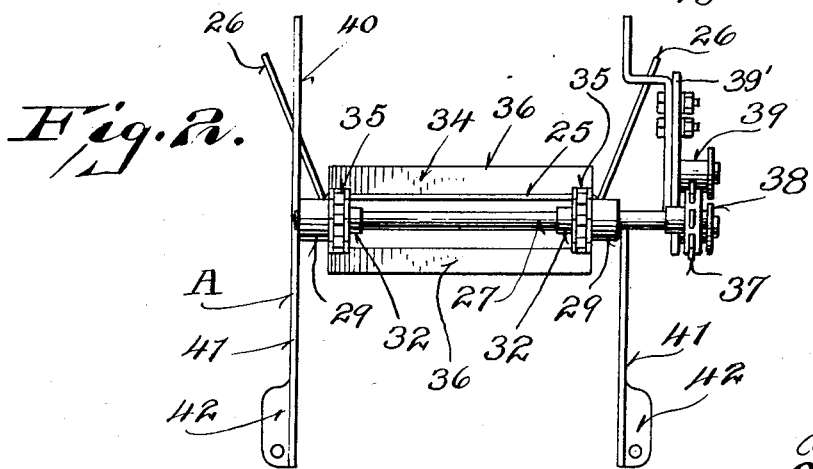
Figure 2 is a front elevation of the attachment per se.
Figure 3:
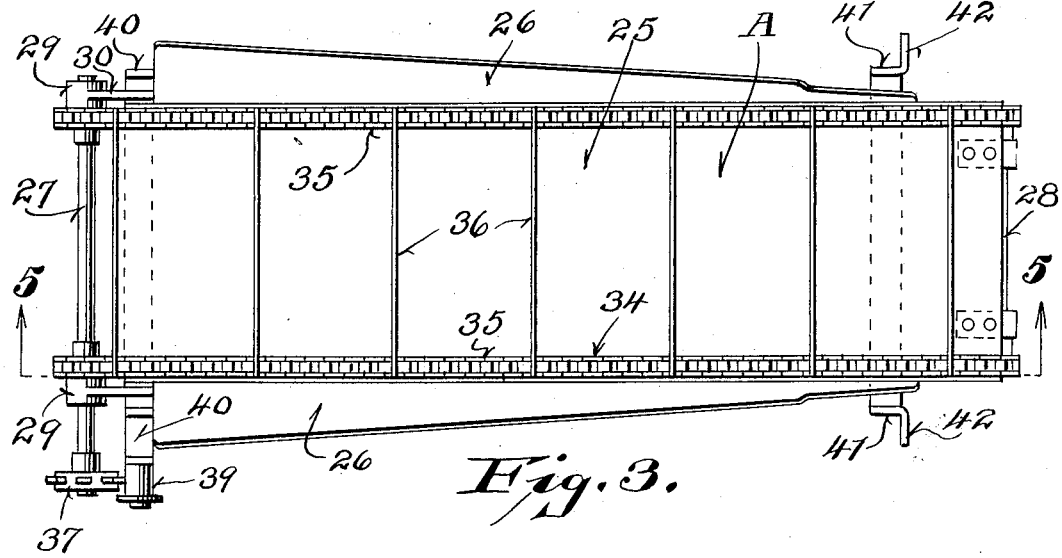
Figure 3 is a top plan view of the attachment.
Figure 4:
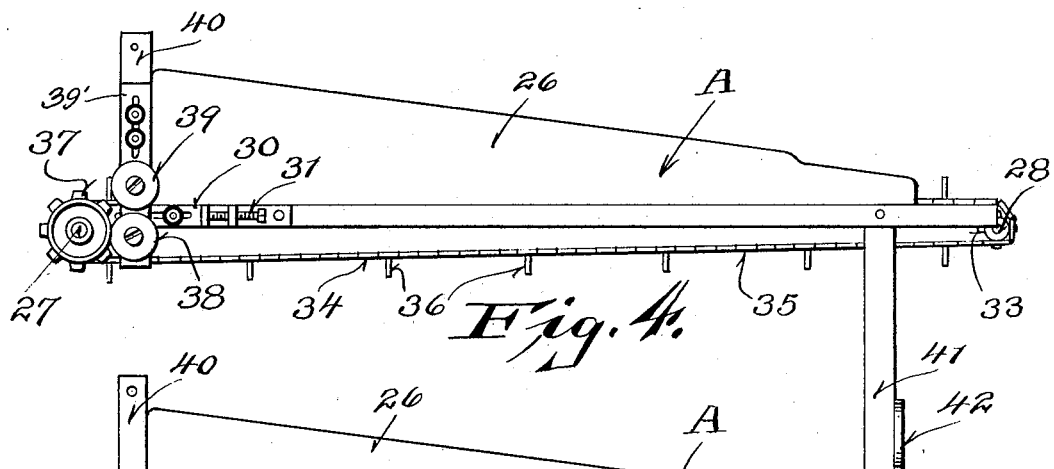
Figure 4 is a side elevation of the attachment.
Figure 5:
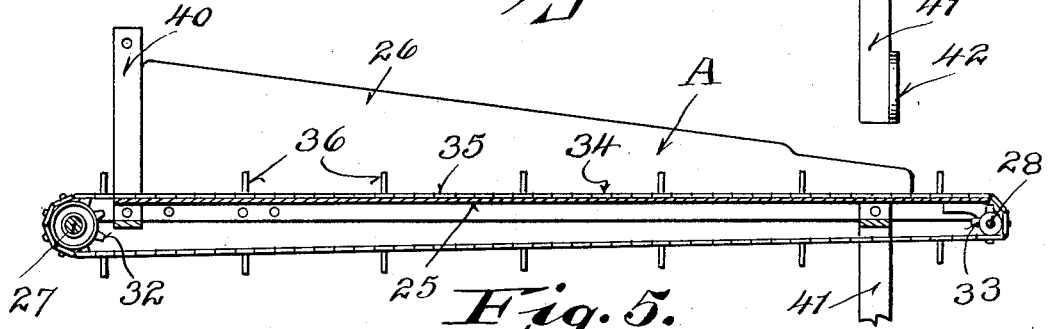
Figure 5 is a longitudinal section through the attachment taken on the line 5—5 of Figure 3, looking in the direction of the arrows; and, Figure 6 is a front elevation of the frame of the attachment.
Figure 6:
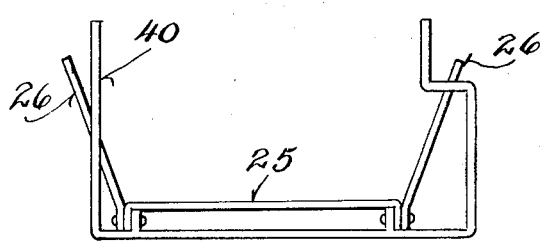

The ensilage cutter and blower B can be of any preferred or standard construction, and only sufficient parts of the ensilage cutter has been illustrated to show the use of my improved attachment.

As illustrated in the drawings, the ensilage cutter and blower B includes a longitudinally extending feed trough or table 10, having mounted therein the endless conveyor 11, which terminates adjacent to the throat end 12 of the cutter housing 13. The inner end of the endless conveyor 11 is trained over sprocket wheels 14, keyed or otherwise secured to a transverse shaft 15. This transverse shaft 15 is rotatably mounted in suitable bearings (not shown) and the shaft has connected therewith, a small drive sprocket wheel.

The cutter housing or cylinder 13 is connected with the blower housing 16 and directly below the rotatable cutter head or cutter cylinder 17, the housing 13 communicates with the blower housing 16 by means of an inlet 18. As in the ordinary construction, the knives of the cutter cylinder or head 17 rotate past the stationary cutter blade 20.

Rotatably mounted in the throat 12 directly in front of the rotatable cutter cylinder or head 17, are the upper and lower ensilage feed rolls 21 and 22. The rear end of the machine is provided with frame bars 23, as shown.

In operation of this type of ensilage cutter and blower, the fine stuff carried with the ensilage drops below the feed rollers 21 and 22 between the rollers and the conveyor 11. This fine stuff falls on the ground and is lost, and, as heretofore stated, where a large quantity of ensilage is being handled, the fine stuff forms a large pile under the machine, and in some cases, this pile reaches such a proportion as to choke the machine and render the same inoperative.

My attachment A completely eliminates the loss of this fine stuff and prevents the dropping of this fine stuff on the ground and insures the delivery thereof to the blower.

The attachment A comprises a trough or table 25 having inclined side walls 26 connected therewith. The ends of the table 25 or the side bars thereof, support suitable bearings for transverse shafts 27 and 28.

The bearings 29 for the shaft 27 can be formed on brackets 30 slidably mounted, and these bearings can be adjusted by means of adjusting screws 31. The shafts 27 and 28 have keyed or otherwise secured thereto, pairs of sprocket wheels 32 and 33, respectively. The pair of sprocket wheels 33 are preferably of a smaller diameter than the sprocket wheels 32, for a purpose which will be later described. The pairs of sprocket wheels 32 and 33 carry the endless conveyor 34 which may consist of side sprocket chains 35 trained over the pair of sprocket wheels 32 and 33 and transversely connecting slats or flights 36. The conveyor slats or flights 36 travel over the top surface of the table 25 in close relation thereto. Obviously, by tightening or loosening the screws 31, the conveyor can be adjusted to take up slack or the like. One end of the shaft 27 is provided with a drive sprocket wheel 37. Arranged on one side of the trough or table, is a pair of idle wheels 38 and 39. These idle wheels 38 and 39 are arranged in close relation to the sprocket wheel 37. The idle wheels 38 and 39 are mounted on an adjustable plate 39' carried by one side of the bracket 40, for a purpose which will be later set forth.

The outer end of the attachment is provided with a U-shaped holding bracket 40, which is secured to the table 25. One leg of the bracket can be utilized for supporting the idle rollers 38 and 39, if so desired. The legs of the brackets extend above the table for a purpose which will also be later described.

Depending from the inner end of the table is an inverted U-shaped supporting bracket 41 and the lower ends of the legs of this bracket 41 can be provided with attaching feet 42.

It is to be noted that the inner end of the table and the conveyor 34 extend beyond the supporting bracket 41.

In applying my device A to a conventional ensilage cutter and blower, the table 25, with the endless conveyor 34 is arranged below the feed table or trough 10 of the machine at the inner end thereof and the inner end of the conveyor 34 is inserted in the casing of the cutter, directly below the cutter and adjacent to the blower inlet opening 18.

In order to insert the endless conveyor 34 into the housing or casing 13, the part of the housing directly below the stationary cutter bar can be pulled down, as shown in Figure 1 of the drawings. The inner holding bracket 41 is connected to one of the frame bars 23 of the machine by the use of suitable bolts 43 which are extended through the ears 42. The upper ends of the outer supporting bracket 40 are riveted or connected by bolts 44 to the feed trough or table 10. The endless conveyor 34 of the attachment A is preferably arranged at an angle to the horizontal with the inner end thereof angling upward toward the rotatable cutter cylinder or head 17.

To bring about the operation of the endless conveyor 34 of my attachment, a drive sprocket chain 45 is provided. This sprocket chain 45 is trained over the sprocket wheel 37 and over the drive sprocket wheel connected to the transverse shaft 15 of the ensilage cutting machine.

The runs of the sprocket chain 45 are trained over the idle wheels 39 and 38 and obviously, by adjusting the plate 39', slack can be taken up in the sprocket chain.

During the operation of the ensilage cutter, the endless conveyor 34 of my attachment will be operated in the direction indicated by the arrow in Figure 1 of the drawings, and any of the fine stuff carried by the silage which drops below the feed rolls 21 and 22 will be caught by the conveyor belt and fed into the housing 13 below the rotatable cutter cylinder or head 17. This fine stuff will be immediately acted on by the blower, and brought into the blower housing 16 and thence thrown into the silo with the cut ensilage.

From the foregoing description, it can be seen that I have provided a novel attachment for ensilage cutters which will effectively catch all of the fine ensilage, and it is of such a character as to permit the same to be readily applied to a conventional ensilage cutter by a layman.

Changes in details may be made without departing from the spirit or the scope of my invention, but what I claim as new is:

1. The combination with an ensilage cutter and blower including a cutter housing, a blower housing having an opening communicating with the cutter housing, a rotatable cutter head in said cutter housing, a feed table leading toward the throat of the cutter housing, and a pair of feed rollers arranged in the throat directly in advance of the cutter head, of an attachment for the ensilage cutter and blower comprising a supplemental feed table, located directly below the first mentioned feed table an endless conveyor on the supplemental feed table, oppositely extending supporting brackets connected with the supplemental table and detachably secured to the ensilage cutter and blower, the conveyor being disposed below the feed rollers and extending into the cutter housing below the cutter head for communication with the blower housing, and means for operating the conveyor from the ensilage cutter and blower.

2. As a new article of manufacture, an attachment for ensilage cutters and blowers comprising a supplemental feed table, an endless conveyor trained over the supplemental table having a drive sprocket wheel, an inverted U-shaped bracket depending from the inner end of the table, and a U-shaped supporting bracket secured to the rear end of the table and extending upwardly therefrom.

JOHN ORTH.